June 25, 1968 W. ROSSNER 3,389,844
DEVICE FOR DIRECTED FEEDING OF WIRES
Filed April 29, 1966 2 Sheets-Sheet 1
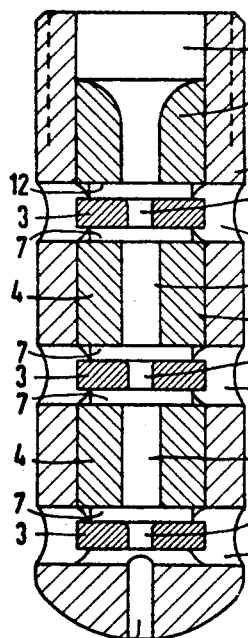
Fig. 1
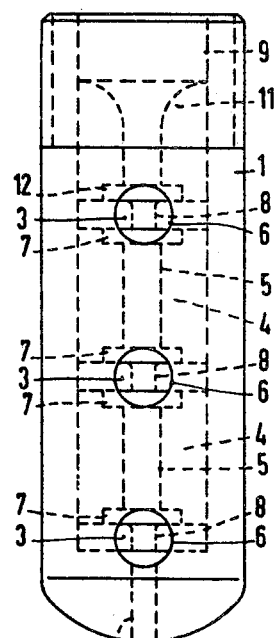
Fig. 2
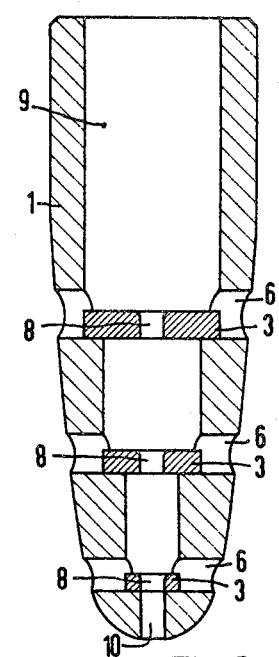
Fig. 6
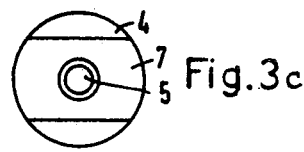
Fig. 3c
Fig. 3a Fig. 3b
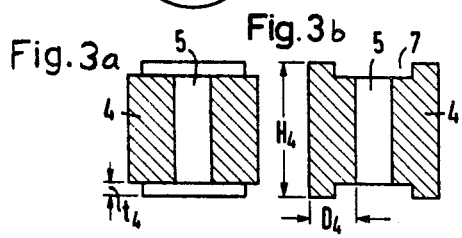
Fig. 5a
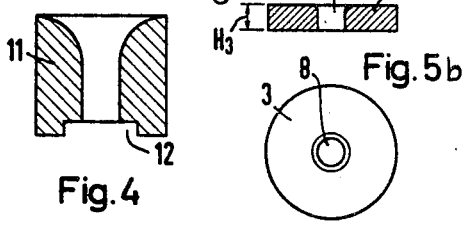
Fig. 4 Fig. 5b
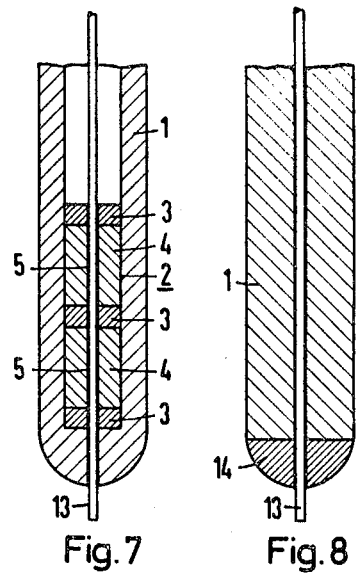
Fig. 7 Fig. 8

3,389,844
DEVICE FOR DIRECTED FEEDING OF WIRES
Wolfgang Rossner, Nuremberg, Germany, assignor to Siemens Aktiengesellschaft, a corporation of Germany
Filed Apr. 29, 1966, Ser. No. 546,412
19 Claims. (Cl. 226—196)

ABSTRACT OF THE DISCLOSURE

Device for directed feeding of rods or wires such as weld wires includes a nozzle-shaped base member formed with a longitudinal bore having at least one step-like offset, a plurality of abrasion-resistant guide elements located in the longitudinal bore, one of the guide elements being supported on the offset in spaced relationship to the other guide elements, the base member being formed with at least one substantially radial bore extending to the guide elements respectively in the longitudinal bore, the guide elements having a pair of opposite end faces located transversely to the longitudinal bore and adapted to guide a wire of abradable material through the base member, whereby material abraded from the wire at one or both end faces of the guide elements is dischargeable from the base member through the radial bores.

---

My invention relates to device for directed feeding of wires and more particularly for the directed feeding of weld wires.

Arc welding, especially precision welding with modern automatic welding machines using a metal-inert gas welding process, requires a very accurate withdrawal or discharge of the weld wire out of the weld nozzle. With weld nozzles known heretofore, the nozzle bore becomes worn and ground out due to the frictional effect of the moving wire, and is more particularly ground out on one side thereof when the wire which is being fed sags so that the wire feed does not take place any longer in the axial direction of the nozzle, resulting in weld failures.

Contact nozzles for weld wires have already become known wherein serially arranged contact elements are located in spaced relationship in transverse bores in the nozzle body or member. Some of the contact elements are adjustably displaceable so that, with the given longitudinal bore of the nozzle, weld wires of varying thickness can be welded. The nozzle member is additionally provided with transverse bores serving as outlet openings for frictionally abraded products which adhere in the form of coatings to the weld wire surface (see for example U.S. Patent No. 1,959,194). Furthermore, devices are known for supplying current to arc weldment with fused or melted electrodes in which a wire coil coaxially surrounding the weld wire or rings of current-conducting material located one above the other serves as contacting means (see for example German Gebrauchsmuster 1,765,847).

Furthermore, with other welding devices also, the weld wire is coaxially surrounded by a wire coil which serves to cleanse adhering metal chips or the like from the weld wire (see for example U.S. Patent No. 2,819,384).

It has already been known to mount welding wire straightening devices (Germany Patent 449,929, U.S. Patent No. 1,676,985) for welding apparatus outside the welding nozzle, preferably in the welding head. Such straightening devices require an exceptionally large amount of space and furthermore have the decided disadvantage that they fail or break down in most cases when the weld wire passes through a burner which is bent or angularly disposed relative to the straightening device and is again plastically deformed, or when the weld wire is bent in several different planes, because with the known straightening devices the straightening action takes place only in a single plane.

With none of these known contact or welding nozzles has there been any success however in preventing the contact elements from becoming worn out. Consequently, an accurate withdrawal or discharge of the weld wire from the welding nozzle no longer becomes possible after an extended operating period.

It is accordingly an object of my invention to provide a device for directed feeding of wires, particularly weld wires, which avoids the foregoing disadvantages of the heretofore known devices and more particularly affords an accurate discharge or withdrawal of the wire from the device, even after operating for a relatively long period of time. Furthermore, notwithstanding the accurate feeding of the weld wire, it is an object of my invention to provide such device as will afford reliable use. Additionally, it is an object of my invention to provide such device which will straighten the wire without requiring an exceptionally great amount of space, and in which breakdown is kept to a minimum.

With the foregoing and other objects in view, I provide, in accordance with the invention, device for directed feeding of wires having a nozzle-shaped base member formed with a longitudinal bore which is offset step-wise one or more times and is adapted to receive a plurality of friction-resistant guide elements mounted in spaced relationship to one another inside the longitudinal bore. At least one radial bore in the base member is respectively associated with each of the guide elements in such a way that the wire friction or abrasion products can emerge from the base member on at least one of the sides or ends of the guide elements. Due to the strictly coaxial or axially symmetrical construction of the base member without radially protruding portions such as screws, nuts, contact springs or the like, a smooth nozzle wall is obtained, permitting the attachment of a coaxial protective-gas nozzle of relatively small dimensions. The guide elements are advantageously maintained in the longitudinal bore by spacer supports suitably mounted therein. These spacer supports are advantageously of tubular construction. The guide elements can also respectively be held spaced from one another with the step-wise breaks or offsets in the longitudinal bore of the base member acting as spacer supports. It is furthermore advantageous that the guide elements be in the form of annular discs having bores that are smaller in diameter than the bore of the spacer supports. For facilitating the introduction of the wire and reducing the wire abrasion, the edge of the bore in the guide elements is provided advantageously with a chamfer at the side or end thereof at which the wire is introduced therein. In order to prevent abrasion or grinding away at a particular location of the base member and to obtain a wire straightening effect, at least three guide elements are advantageously located along the axial direction of the base member. In order to reduce the frictional resistance in the weld wire supply or feeding device, the dimension of the spacer support measured in the axial direction of the base member is a multiple of the dimension of the guide elements measured in the same direction. There are furthermore provided at the side of the spacer support groove-like recesses for facilitating the discharge of wire friction or abrasion products from the wire feeding device. A particularly desirable construction of the wire feeding device is obtained when the guide elements and the spacer supports are assembled in a column with interchangeable guide elements and spacer supports. The diameter of the bore at the outlet end of the base member is advantageously substantially the same as the diameter of the bore of the guide elements. In order to be able to introduce the wire more readily, a funnel-shaped guide member is provided at the wire inlet end of the base member. To avoid the danger of a wire jamming directly in the initial portion of the wire feeding device, the guide member is provided with a groove-shaped recess in the wire outlet end thereof. The diameter of the radial bores is advantageously greater than the longitudinal dimension of the guide elements. It is also advantageous that a plurality of radial bores are associated with each guide element because the discharge of the wire abrasion products is thereby considerably facilitated. Furthermore, it is advantageous that the guide elements are located symmetrically to the longitudinal axis of the radial bores. Consequently, the wire abrasion products can pass on both sides or ends of the guide elements to the radial bores and thus to the outside of the device. With special advantage, a gaseous medium conducted through the longitudinal bore of the base member serves for accelerating the discharge of the wire friction or abrasion products deposited on the guide elements.

As a further feature of my invention, I provide means for straightening wires or other elongated members. It is particularly advantageous for the straightening operation that the guide elements be located so that they are displaceable in a direction opposite to the bend in the wire which is to be straightened. For this purpose the dimensions of the guide elements are kept advantageously smaller than those of the longitudinal bore of the base member, and the guide elements are displaceable by means of set screws.

Other features which are considered as characteristic for the invention are set forth in the appended claims.

Although the invention is illustrated and described herein as embodied in device for directed feeding of wires, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a longitudinal sectional view of one embodiment of the device for directed feeding of wires constructed in accordance with my invention;

FIG. 2 is a view of the embodiment of FIG. 1 rotated about the longitudinal axis through 90° and showing the interior thereof in dotted lines;

Figure 9:
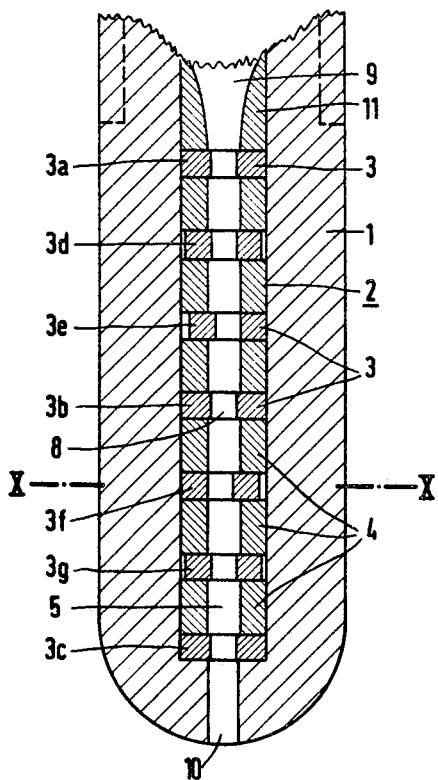
Figure 10:
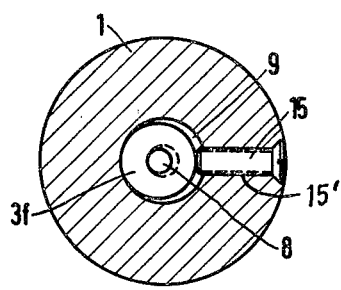

FIGS. 3a, b and c respectively show two sectional views rotated 90° with respect to one another and a plan view of a spacer support forming part of the invention as shown in FIG. 1;

FIG. 4 is a longitudinal sectional view of the inlet member forming part of the embodiment of FIGS. 1 and 2;

FIGS. 5a and b are sectional and plan views respectively of the guide element forming part of the embodiment of FIGS. 1 and 2;

FIG. 6 is a longitudinal sectional view of another embodiment of the invention wherein the spacer inserts are omitted from the longitudinal bore;

FIG. 7 is a simplified sectional and diagrammatic view of another embodiment of a device constructed in accordance with the invention;

FIG. 8 is a longitudinal sectional and diagrammatic view of yet another embodiment of the invention;

FIG. 9 is a longitudinal sectional view, partly broken away, of a further embodiment of the invention; and FIG. 10 is a sectional view taken along the line X—X in FIG. 9 rotated through an angle of 90°.

Referring now to the drawings and first to FIGURES 1 and 2 thereof, there is shown a base member 1 of the device for directed feeding of wires constructed in accordance with my invention, which is in the form of a welding nozzle. The base member 1, hereinafter referred to as the nozzle member, consists of relatively soft material of good electrical conductivity, for example copper or a copper alloy. Insert means 2 are provided in the nozzle bore 9 and consist of guide elements 3 and spacer supports 4. The guide elements 3 are of disc-shape construction and are provided with a bore 8 corresponding to the diameter of the wire which is to be guided, preferably being 0.1 mm. greater in diameter than the diameter of the wire. To reduce the friction applied to the wire and to facilitate the insertion of the wire, the guide elements 3 at the wire inlet ends thereof are provided with a chamfer as can be seen more clearly in FIG. 5a. To have trouble-free operation of the device, it is important that the guide elements 3 consist of hard materials such as cobalt alloys, tool steels, ceramic materials or other materials that are employed for drawing nozzles. In order also to avoid abrasion or grinding away of the nozzle member 1 when bent wires are being fed and to simultaneously carry out a straightening action, at least three guide elements 3 are provided so that the wire can neither wear away the nozzle bore 9, 10 at the inlet end thereof nor in the middle nor at the outlet end thereof. If the straightening action can be dispensed with, less than three guide elements may be mounted and are adequate. The spacers 4 are of tubular-shaped or sleeve-shaped construction and are provided at the end faces thereof with groove-like recesses 7 (see FIGS. 3b and c particularly). The main purpose of the spacer supports 4, as is implied by the name thereof, is to maintain the guide elements 3 at a predetermined spacing from one another. Since the spacer supports 4 consist of current-conducting material such as copper for example, they also increase the electrical effective nozzle cross-section and can be employed therewith for electrically contacting the weld wire which is not illustrated in FIGS. 1 and 2. Experimentation has indicated that it is of extreme importance that the diameter of the bore 5 of the spacer member 4 be kept somewhat larger than the bore diameter 8 of the guide elements 3. An increase in the bore diameter 5 of substantially 0.2 mm. as against the bore diameter 8 is adequate for the conventional weld wire cross-sections. With the increased bore diameter 5, a jamming or freezing of the weld wire at the spacers 4 due to a lengthy frictional path is safely avoided. Furthermore, a result thereof is that the wire material acts only on the guide elements 3 and no resistance is put up to the passage of abraded particles through the spacer supports 4. In order to have a slight amount of abrasion, it is furthermore desirable that the longitudinal dimension $H_4$ of the spacer support 4 be a multiple of the longitudinal dimension $H_3$ of the guide elements. The depth $t_4$ of the slot or groove 7 at the end faces of the spacer support 4 is a few millimeters and its width corresponds substantially to the sum of the diameter of the bore 5 and a single thickness of the tubular wall of the spacer 4. The insert 2 is advantageously of such construction that a guide element 3 respectively is held in place by two spacer supports 4. The insert 2 can be mounted as a unit in the bore 9, preferably by being press-fitted therein. The step-like narrowing of the nozzles bore at 10 acts as a stop for the insert 2 within the bore of the nozzle member 1. The diameter of the bore 10 at the outlet end of the nozzle corresponds substantially to the diameter of the bore 8 of the guide elements. It can however advantageously be smaller in diameter by about 0.05 mm. in order to obtain a better current transfer therebetween. To facilitate the insertion of the wire, a funnel-shaped rounded inlet member 11 is provided at the wire inlet end of the nozzle member 1. The inlet member 11 serves also as gas inlet means for passing a gaseous medium through the bore 9 to accelerate the discharge of material abraded from the wire extending therethrough and deposited on the guide elements 3. The inlet member 11 is provided, as shown in FIG. 4, with a groove-shaped recess 12 at the wire outlet end thereof. At the level of the guide elements 3 within the nozzle member 1, radial bores 6 are provided in the nozzle member 1 and are directed substantially perpendicularly to the longitudinal axis of the nozzle member 1. The diameter of the bores 6 is at least equal to the longitudinal dimension $H_3$ of the guide element 3 in addition to twice the groove-depth $t_4$. The abrasion products thereby pass from the guide elements 3 to the groove slots 7, 12 and through the bores 6 to the exterior of the nozzle member so that the nozzle bore 10 no longer becomes clogged.

In the embodiment of FIG. 6, spacer supports are no longer provided in the longitudinal bore 9 thereof. To secure the guide elements 3 within the nozzle member 1, the longitudinal bore 9 thereof is of stepwise reduced cross-section. The dimensions of the guide elements 3 are predetermined so that they are held spaced from one another immovably in press-fitted seats on the step-shaped abutments or offsets. The radial bores 6 in the embodiment of FIG. 6 correspond substantially to the radial bores 6 described hereinabove with regard to the embodiment of FIG. 1.

It is further noted that protective gas employed conventionally with electric arc welding can be used for the accelerated discharge of the abraded material deposited on the guide elements 3. Moreover the flow resistance through the gas outlet openings located as a rule above the insert member 2 (FIGS. 1 and 2) in the nozzle member, but not shown in the drawing, can be increased by means of nozzle-like tapering so that a considerable portion of the protective gas is conducted to the outlet openings 6 through the clearance between the weld wire and the guide elements 3. On the other hand, the advancement of the protective gas can also naturally be increased by increasing the clearance between the weld wire and the guide elements 3.

A further variation of the embodiment of the invention shown in FIGS. 1 to 5 can be obtained when employing frictionless weld wires. Examples thereof are shown in FIGS. 7 and 8 of the drawing.

The nozzle member 1 shown in FIG. 7 is also provided with an insert means 2 consisting of guide elements 3 and spacer supports 4. The guide elements 3 and spacer supports 4, as above-described with respect to FIGS. 1 and 2, are assembled as a unit. Under those conditions where the weld wires 13 are frictionless or friction-free, the bores 5 of the spacers need not have a larger diameter than the bores of the guide members 2, leading to a better current transfer between nozzle member 1 and weld wire 13.

In the embodiment shown diagrammatically in FIG. 8, the nozzle member 1 is provided with a hard-material tip 14 which can be applied by means of soldering, spraying or welding. The bore for the weld wire 13 can be formed, insofar as it has not already been previously provided therein, by means of ultra sound waves, electrical erosion or electrochemical erosion, electron beams or similar means. The device constructed in accordance with my invention can be used for substantially all types of wire-guiding weld burners, particularly machined precision welding apparatus. An example of such apparatus is the automatic welding of cooling pockets in transformer tanks.

The device constructed in accordance with my invention can also be employed for straightening wires or other elongated members. For that purpose the guide elements 3 are arranged with respect to the longitudinal axis of the nozzle member 1 so that they are located in an opposite direction preferably to the bend of the member which is to be straightened. Accordingly, set screws can be mounted at the level of the guide elements 3, for example opposite the bores 6 and staggered 90° with respect to one another, so as to permit adjustment of the individual guide elements 3 in a direction perpendicular to the axial direction of the device. This type of wire straightening device is considerably more space-saving than the conventional roller straightening devices employed heretofore.

As shown in FIGS. 9 and 10 of the drawings the guide elements 3a, 3b, 3c are held essentially in the longitudinal bore 9 of the nozzle member 1 and correspond in dimensions to the guide elements 3 of FIGS. 1 and 2. The guide elements 3d, 3e, 3f and 3g in the embodiment of FIG. 9 have a smaller outer diameter than the longitudinal bore 9 and are staggered or offset with respect to the longitudinal axis of the nozzle. The guide element 3d is offset toward the viewer in a direction substantially perpendicular to the plane of the drawing and the guide element 3g is offset substantially perpendicularly to the drawing plane away from the viewer. The guide elements 3e and 3f are offset respectively rightward and leftward in the plane of the drawing as can be seen for example in FIG. 10 with respect to the guide element 3f. By means of the set screws 15 suitably threaded in radial bores 15' as shown in FIG. 10, the guide elements 3b, 3e, 3f and 3g can be retained in their eccentric position.

I claim:

1. Device for directed feeding of rods or wires such as weld wires comprising a nozzle-shaped base member formed with a longitudinal bore having at least one step-like offset, a plurality of abrasion-resistant guide elements located in said longitudinal bore, one of said guide elements being supported on said offset in spaced relationship to the other guide elements, said base member being formed with at least one substantially radial bore extending to the guide elements respectively in said longitudinal bore, said guide elements having a pair of opposite end faces located transversely to said longitudinal bore and adapted to guide a wire of abradable material through said base member, whereby material abraded from the wire at one or both end faces of said guide elements is dischargeable from said base member through said radial bores.

2. Device according to claim 1 including spacer supports located in said longitudinal bore for holding said guide elements in spaced relationship to one another.

3. Device according to claim 2 wherein the dimension of said spacer supports in the axial direction thereof is a multiple of the dimension of the guide elements in the same direction.

4. Device according to claim 2 wherein said spacer supports are formed with groove-shaped recesses.

5. Device according to claim 2 wherein said guide elements and said spacer supports are assembled alternatingly in a column.

6. Device according to claim 2 wherein said spacer supports are of substantially tubular structure.

7. Device according to claim 2 wherein the step-like offsets of said longitudinal bore serve as spacer supports.

8. Device according to claim 2 wherein said spacer supports are formed with longitudinal bores and said guide elements are in the form of annular discs having a bore of smaller diameter than that of the longitudinal bores of said spacer supports.

9. Device according to claim 1 wherein said end face of said guide elements facing the wire inlet end of said base member is formed with a chamfer.

10. Device according to claim 1 wherein at least three guide elements are aligned in said longitudinal bore coaxially with said base member.

11. Device according to claim 1 wherein said guide elements are formed with an axial bore, and the longitudinal bore of said base member at the wire outlet end thereof has substantially the same diameter as that of the axial bores of said guide elements.

12. Device according to claim 1 including a funnel-shaped guide member received in said longitudinal bore of said base member at the wire inlet end thereof.

13. Device according to claim 12 wherein said funnel-shaped guide member is formed with a groove-shaped recess at the wire outlet end thereof.

14. Device according to claim 1 wherein said radial bore has a diameter greater than the dimension of the respective guide element in the axial direction thereof.

15. Device according to claim 1 wherein a plurality of said radial bores are disposed substantially equidistantly about the periphery of said base member and communicating with each of said guide elements.

16. Device according to claim 15 wherein the respective guide element is located symmetrically to the longitudinal axis of said radial bores.

17. Device according to claim 1, including gas inlet means for passing a gaseous medium through said longitudinal bore of said base member so as to accelerate the discharge of material abraded from the wire and deposited on the guide elements.

18. Device according to claim 1 wherein said guide elements are adjustably displaceable in a direction opposite to a bend in a wire fed therethrough so as to straighten the wire.

19. Device according to claim 18 wherein said guide elements are formed with axial bores and are smaller in diameter than the diameter of the portion of said longitudinal bore in which they are received, said guide elements being displaceable transversely to the axis of said longitudinal bore.

References Cited

UNITED STATES PATENTS

| | | | |
|---|---|---|---|
| 2,756,310 | 7/1956 | Galbraith | 219—130 |
| 2,783,360 | 2/1957 | Osborn | 219—130 X |

ALLEN N. KNOWLES, *Primary Examiner*.

UNITED STATES PATENT OFFICE

CERTIFICATE OF CORRECTION

Patent No. 3,389,844 June 25, 1968

Wolfgang Rossner

It is certified that error appears in the above identified patent and that said Letters Patent are hereby corrected as shown below:

In the heading to the printed specification, after line 5, insert -- Claims priority, application Germany, S 96,896, May 3, 1965 --.

Signed and sealed this 20th day of January 1970.

(SEAL)
Attest:

Edward M. Fletcher, Jr.
Attesting Officer

WILLIAM E. SCHUYLER, JR.
Commissioner of Patents